July 4, 1950  E. ESSON  2,513,407
COOKSTOVE
Filed Oct. 18, 1944  3 Sheets-Sheet 2

Inventor
Edwin Esson.
By Fishburn & Mullendore
Attorney

July 4, 1950 E. ESSON 2,513,407
COOKSTOVE
Filed Oct. 18, 1944 3 Sheets-Sheet 3

Inventor
Edwin Esson.
By Fishburn & Mullendore
Attorney

Patented July 4, 1950

2,513,407

UNITED STATES PATENT OFFICE 2,513,407

COOKSTOVE

Edwin Esson, Kansas City, Mo.

Application October 18, 1944, Serial No. 559,297

5 Claims. (Cl. 126—1)

This invention relates to cooking stoves of the type having a firebox from which products of combustion are directed in heating contact with a cooking top and/or an oven and has for its principal object to provide a stove of this character which provides for selective and efficient control of the products of combustion so as to effect heating of the particular portions of the cooking top to be used and substantially uniform temperatures in all parts of the oven.

Other objects of the invention are to provide a cook stove for burning solid fuels having the exterior appearance of a modern electric or gas range; to provide a solid fuel burning cook stove having insulated walls for confining the heat and prevent heating up of the kitchen in which the stove is to be used; to provide a stove structure wherein the passageways for products of combustion are readily cleaned and kept in an efficient condition; to provide a stove structure particularly adapted for application of electric heater units in combination with the firebox; to provide a cook stove composed of unit sections to facilitate assembly and insulation of the walls of the units; and to provide an insulating passageway between the section containing the firebox and that containing the oven.

In accomplishing these and other objects of the invention, I have provided improved structure, the preferred form of which is illustrated in the accompanying drawings wherein.

Referring more in detail to the drawings:

1 designates a cook stove including an inner metal structure composed of a plurality of main units or sections including a firebox unit 2, an oven unit 3, a flue unit 4, and a base 5.

Figure 4:
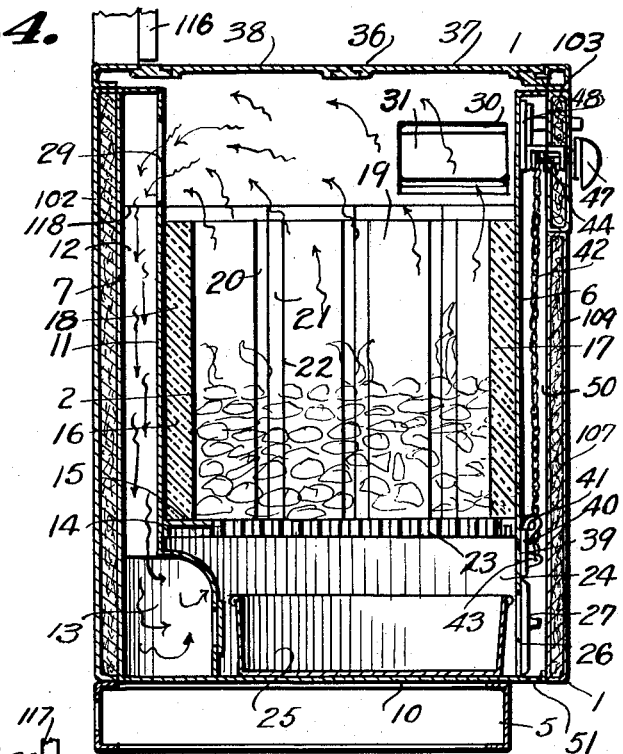
Fig. 4 is a cross section taken on the line 4—4 of Fig. 3.

The firebox unit 2 includes front and rear walls 6—7, side walls 8—9, and a bottom 10 suitably connected to provide an integral structure. Spaced inwardly from the rear wall 7 is a partition 11 to provide a down flue 12 therebetween and which is connected at its lower end with a horizontal duct 13 as shown in Fig. 4. Extending horizontally between the side walls 8 and 9 and the walls 6 and 11 is a grate-supporting frame 14 having marginal ledge portions 15 supporting the lower ends of refractory lining 16 constituting the walls of a firebox 17 which in the illustrated instance is adapted for burning solid fuel such as coal, coke, or the like. The refractory lining at the front and rear of the firebox may be single slabs 18 extending across the width thereof but the refractory linings forming the sides of the firebox preferably comprise a series of juxtaposed tiles 19 having rabbet-like edges 20 and 21 to form vertical grooves or passageways 22 for flow of products of combustion upwardly of the sides of the fuel bed supported on grate bars 23 that are carried on the frame 14. The space between the bottom 10 and underside of the grate bars 23 provides a compartment 24 for containing an ash pan 25 that is adapted to be inserted and removed through an opening 26 provided in the lower portion of the front wall 6 and which is normally closed by a door 27 hinged at one side thereof as indicated at 28, Fig. 1. The refractory lining terminates short of the upper edges of the side walls of the firebox to accommodate a flue outlet opening 29 in the upper portion of the partition 11 and an outlet 30 in the side wall 9 at a point near the front wall 6 as best shown in Fig. 4. The opening 30 is adapted to be closed by a damper 31 pivoted near the horizontal center thereof by a shaft 32 having an operating end 33 projecting forwardly to accommodate an operating handle or knob 34 by which the damper may be opened to allow discharge of products of combustion through the opening 30 or the damper may be closed to direct flow of products of combustion through the opening 29 for direct flow through the down flue 12 and laterally through the duct 13 for discharge into the oven unit 3 of the stove later described. The portion 35 of the side wall 9 containing the opening 30 is preferably inclined inwardly over a portion of the firebox to connect with the cooking top 36 half of which is supported directly over the major portion of the firebox and is provided with removable cooking plates or lids 37 and 38 that cooperate with the inclined portion 35 of the side wall to close the top of the firebox. Combustion supporting air is admitted to the ash compartment for upflow between the grate bars through air inlet openings 39 in the front wall 6 between the level of the grate and the ash pan opening 26. The openings 39 are controlled by a damper 40 hinged at the upper edge thereof as indicated at 41. The damper 40 is raised and lowered through a flexible connection 42 having one end fixed to an arm 43 projecting forwardly from the damper 40 and having its other end wound upon a reel 44 carried on a shaft 45 that is mounted in a bracket 46. The shaft 45 has an operating knob 47 extending forwardly in substantially lateral alignment with the operating knob 34.

Figure 1:
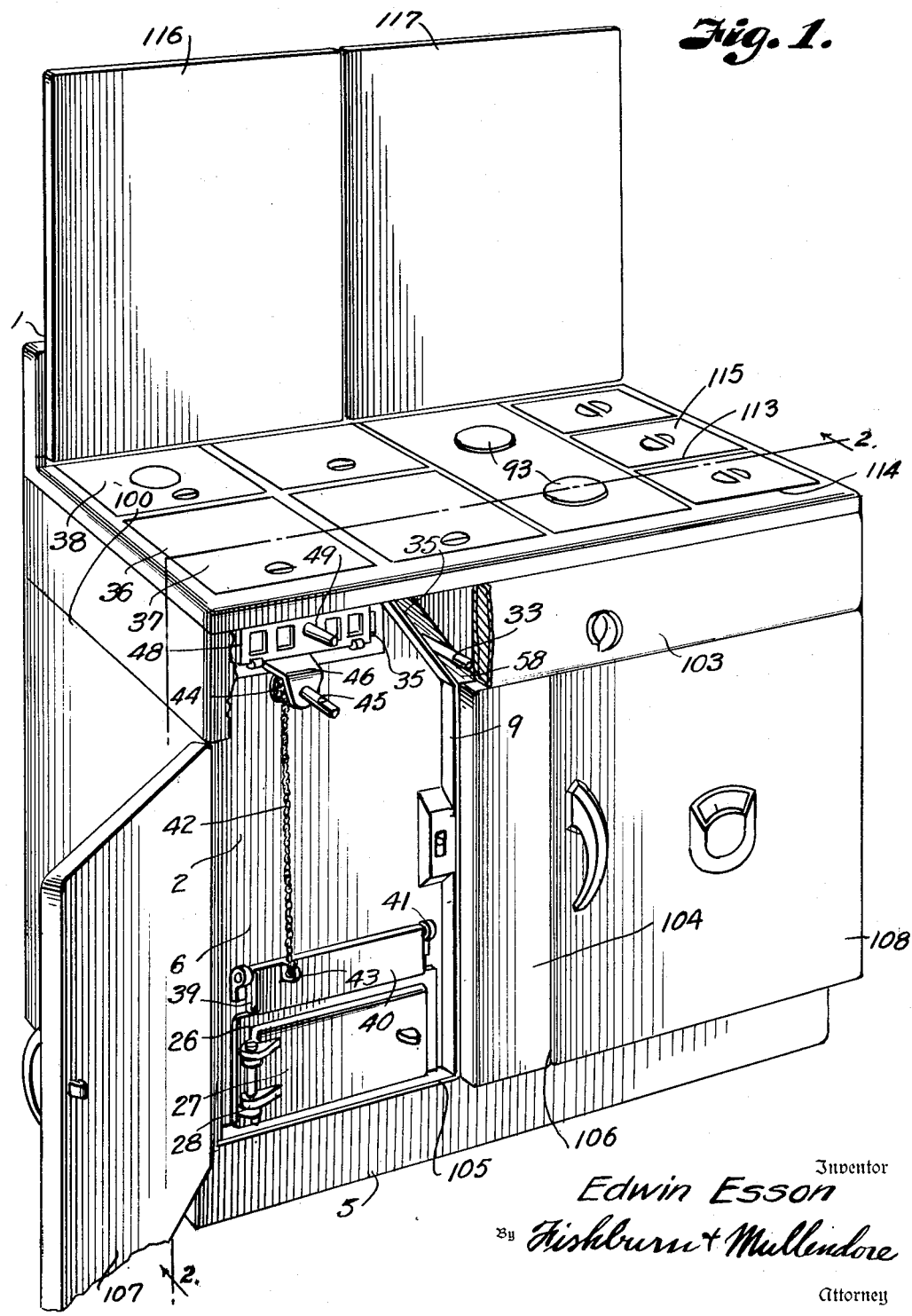
Fig. 1 is a perspective view of a cook stove embodying the features of the present invention.

Check air may be omitted to the upper portion of the firebox through a slide damper 48 manipulated by an arm or lug 49 extending forwardly therefrom as shown in Fig. 1.

In order that the stove may be enclosed in an insulating covering, the front wall 6 is inset rearwardly from the forward edges of the side walls to provide a vertical air space 50 having an inlet 51 at the bottom thereof for admitting combustion supporting air to maintain and suitably control burning of the fuel when the stove is in operation.

The oven unit 3 includes metal side walls 52—53, a rear wall 54, a front wall 55, a bottom 56, and a top 57 to form an integral unit similar to the firebox and which is adapted to be supported in laterally spaced relation with the side wall 9 of the firebox on the base 5.

Figure 2:
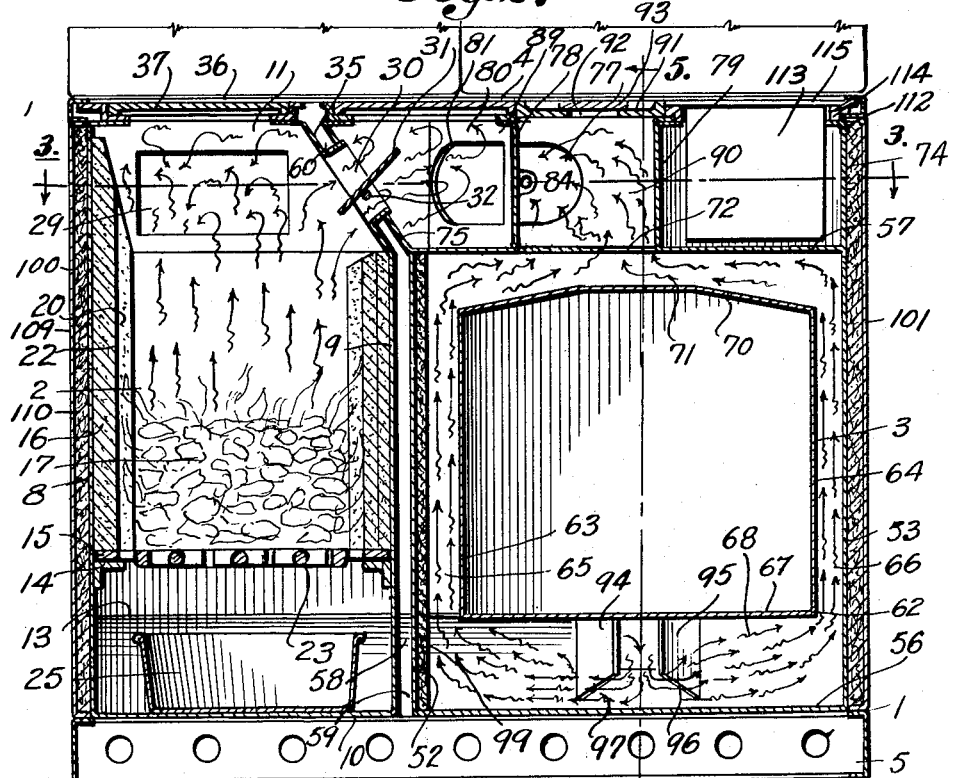
Fig. 2 is a longitudinal view through the stove taken on the line 2—2 of Fig. 1.

As above mentioned, the side wall 52 is spaced from the side wall 9 to provide a vertical air passageway 58 therebetween for preventing excessive conduction of heat to that side of the oven unit. The passageway 58 may be open at the lower end 59 and the top and continues upwardly through a space 60 that is provided between the upper portion of the firebox unit and the unit 4 previously mentioned as best shown in Fig. 2.

Mounted within the oven unit and insertable through an opening 61 in the front wall 55 is an oven shell 62 having side walls 63 and 64 spaced from the inner faces of the side walls 52 and 53 to provide vertical passageways 65 and 66 therebetween, a bottom 67 spaced upwardly from the bottom 56 to provide a passageway 68 under the oven and which connects at the side with the passageways 65 and 66. The oven shell also includes a rear wall 69 and a top 70, the top being spaced below the top 57 to provide a passageway 71 over the top of the oven which connects with the upper ends of the side passageways 65 and 66. The top 57 of the oven unit has an opening 72 substantially midway the width of the oven as shown in Fig. 2.

The unit 4 is mounted directly upon the top of the oven unit and has a front wall 73 forming an upward continuation of the front wall 55, a side wall 74 forming an upper continuation of the side wall 53, an inclined side wall 75 extending parallel with the upper inclined portion of the firebox to close the sides of the space 60 previously described, and a rear wall 76 having a flue outlet opening therein. The flue outlet opening is adapted for connection with a chimney when the stove is in operation. Extending from the front to the back of the unit 4 are spaced partitions 78 and 79 located on the respective sides of the opening 72 to provide for flow of spent products of combustion to the flue outlet 77. The partition 78 substantially registers with the center of the flue outlet opening 77 and terminates in an angularly extending terminal 80 connected with the rear wall 76 at the side of the outlet opening 77 adjacent the firebox unit. Formed in the angular portion of the partition is an opening 81 for direct discharge of products of combustion that are passed from the firebox through the openings 30 and/or 29.

Figure 3:
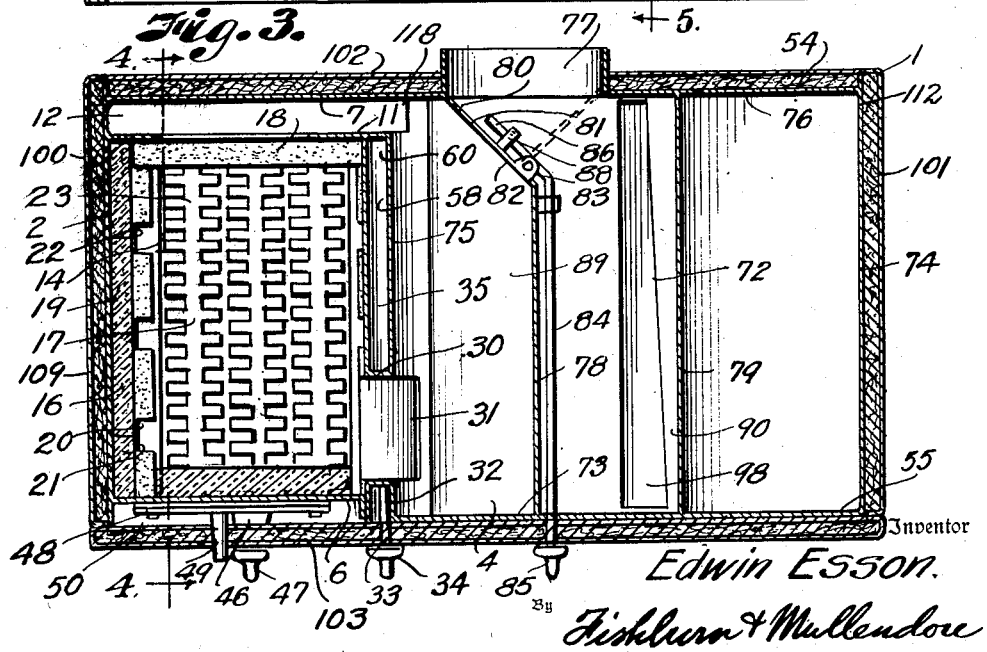
Fig. 3 is a horizontal section on the line 3—3 of Fig. 2.

In order to divert flow of products of combustion from the firebox through the down flue 12 and about the shell of the oven, the opening 81 is adapted to be closed by a damper 82 pivotally mounted as indicated at 83 so that it may be swung from closing position with the opening 80 to close the space between the partition 78 and the opposite side of the flue opening 77 as shown in dotted lines, Fig. 3.

In order to manipulate the damper 82, I provide a rotatable rod 84 suitably journaled alongside the partition 78 and having an end projecting through the front wall of the oven unit and carrying an operating knob or lever 85 similar to the operating lever 34 previously described. The rear end of the rod 84 has an angularly extending terminal 86 projecting through a slot-like opening 87 provided between the damper and a bracket 88 that is fixed to the damper. It is obvious that when the rod is rotated from the position shown in Fig. 3 the angular end thereof swings the damper 82 to the dotted line position indicated in Fig. 3.

The other portion of the cooking top is carried above a space or passageway 89 that is provided between the portion 75 of the end wall 52 and the partition 78 and closes the top thereof. The passageway 90 between partitions 78 and 79 is closed by an extension 91 of the cooking top and which is provided with cleanout openings 92 that are closed by removable lids 93 whereby access is had to the space between the partitions and through the slot-like opening 72 to the passageway across the top of the oven shell.

Figure 5:
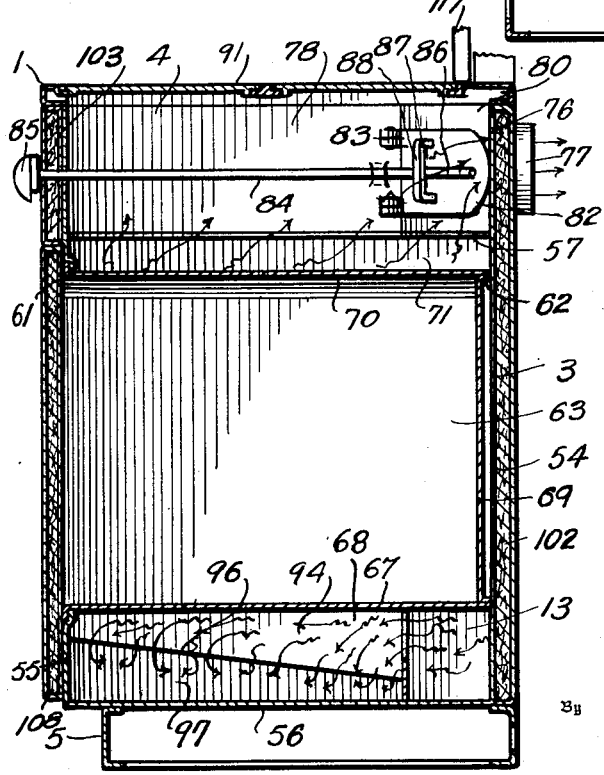
Fig. 5 is a similar section taken on the line 5—5 of Fig. 2.

In order to distribute flow of hot products of combustion substantially uniformly from the front to the back of the oven walls, I provide a division of the passage 68 by providing distribution from a duct of gradually decreasing capacity which is defined by forwardly extending partitions or baffles 94 and 95 converging from the rear wall of the oven unit and connecting with the front wall as shown in Fig. 5. The lower edges 96 of the partitions or baffles slope upwardly so that the effective areas of the outlets 97 thereunder increase in capacity from the rear toward the forward portion of the oven to cause substantially uniform flow of the products of combustion from the duct 13 to the passageways 65 and 66 at the sides of the oven shell, the duct 13 being extended through the side walls 9 and 52 connected with the baffle 94.

In order to control outlet of the products of combustion from the passageway at the top of the oven and prevent channeling thereof toward the outlet end, the opening 72 is also preferably tapered from the front end 98 thereof toward the flue outlet 77 whereby the opening has greater capacity near the front of the stove and is gradually constricted in the direction of the flue outlet.

To further insulate the wall of the oven unit nearest the firebox unit, the wall 52 may be lined on the inner side thereof with a sheet of insulating material 99.

The units, after being assembled upon the base 5, are preferably covered by side panels 100 and 101 and a rear panel 102, a front horizontal panel 103 extending transversely across the stove above the opening of the oven and a vertical panel 104 at the side of the oven opening. The panels 103 and 104 cooperate with the forward edges of the side panels 100 and 101 to provide door openings 105 and 106 which are normally closed by hinged panels or doors 107 and 108. The panels thus described, with the possible exception of the rear panel, have the outer sheets 109 thereof coated with a suitable finish such as porcelain to enhance the appearance of the stove. The outer sheets form a space for containing an insulating material 110 whereby the front, rear, and side walls of the stove are insulated so as to confine the heat of the burning fuel and to prevent heating up of the room in which the stoves are installed. The space 112 between the side wall 53 of the oven unit and the partition 79 may contain a plurality of deep well cookers 113 depending therein through openings 114 of the cooking top as best shown in Figs. 1 and 2, the deep well cookers being provided with covers 115. If desired, the top of the stove including the cooking top, may be enclosed over when the stove is not in use by hinged covers 116 and 117. The inclined terminal of the wall 75 is also provided with an opening 118 in registry with the down flue 12 to provide outlet for the products of combustion when the portion of the cooking top between the upper end of the wall 75 and the partition 78 is used at the same time the oven is heated.

In operating a stove constructed and assembled as described, and assuming that a fire is built within the firebox using a solid fuel, such as coal, combustion of the fuel is maintained by operating the knob on the shaft 45 to cause the reel 44 to wind the cable 42 thereon to raise the damper 40. Combustion supporting air is then admitted into the space 50 and through the opening 29 responsive to the chimney draft through the flue outlet 77, the air passing upwardly through the grooves 22 in the refractory blocks so as to support combustion of the fuel and maintain burning of the gases evolved therefrom. The products of combustion pass upwardly in the firebox and impinge along the underside of the cooking lids 37 and 38 and are discharged through the opening 29 for flow through the down flue 12 or for direct discharge through the opening 81 depending upon the position of the damper 82. If it is desired not to heat the oven, the damper is moved to the dotted line position, Fig. 3; consequently, the chimney draft will draw the hot products of combustion under the cooking top directly to the flue connection. When the damper is in this position, it substantially seals off the passageway surrounding the oven so as to hold the heat in the oven if the oven has been in operation. If it is desired to heat only the side of the cooking top over the firebox, the damper 31 is closed and if the oven is not in use connection is maintained with the flue through the opening 118.

If it is desired to heat the other half of the cooking top without heating the oven, the damper 31 is opened whereupon a portion of the products of combustion will pass therethrough and along the underside of the plates covering that portion of the cooking top for discharge through the opening 81 to the flue outlet. If the oven is in use, the hot gases passing through the opening 30 will find exit by way of the down flue through the opening 118. It is thus obvious that either one-half or the entire cooking top may be heated depending upon the amount of cooking surface to be used regardless of whether the oven is in or out of use.

When it is desired to use the oven, the damper 82 is moved to the position shown in full lines, Fig. 3, so as to close the opening 81. The draft is then through the down flue 12 to the duct 13 so that the gases of combustion are discharged between the baffles 94 and 95 and substantially uniformly distributed along the undersloping edges 96 thereof to flow in uniformly divided streams under the respective sides of the oven heating the bottom thereof. The hot gases after passing under the bottom of the oven pass upwardly through the passages 65 and 66 heating the sides and then travel across the top to the opening. The shape of the opening 72 prevents short circuiting of the gases from the upper top portion of the oven and maintains substantially uniform flow thereover to bring all parts of the oven to substantially uniform baking temperature. The air space 60 between the firebox and oven units supplemented by the insulating material 99 prevents the hot side of the firebox from transmitting heat to the passageway 65 so that the temperature of the oven wall 63 is no hotter than the wall 64. When the oven is in use the hot products of combustion impinge against the walls 57 and 79 of the deep well cooker so as to maintain the vessels therein in hot condition.

If desired, electrical units (not shown) may be suspended within the deep well cooking space in place of the deep well cookers so that electricity may be used for cooking purposes. Likewise, electrical and grill units may be placed in the oven and used to bring the oven to desired temperature after which the fire in the firebox will maintain the temperature and the operation of the electrical units may be suspended.

From the foregoing, it is obvious that by providing the divided flow around the oven I have provided a cook stove constructed to maintain substantially uniform temperatures in all parts of the oven and that the hot products of combustion may be passed under selected portions of the cooking top so as to provide a cook stove having cooking flexibility approaching stoves using gaseous fuels.

It is also apparent that the heat is confined and, therefore, operation of the stove will not excessively heat the room in which it is installed.

The stove is also of compact arrangement and has the pleasing appearance of a modern gas or electric cooking range.

What I claim and desire to secure by Letters Patent is:

1. A stove of the character described including a firebox unit, an oven unit having a passageway therearound for flow of products of combustion, a down flue connected with the firebox, a duct connecting the down flue with the passageway in the oven unit, a cooking top supported above the firebox and oven units, a partition extending under the cooking top intermediate the firebox and oven units and having openings at opposite ends thereof, a damper in the opening remote from the down flue, an outlet flue having connection with the firebox and the passageway in the oven unit, and a damper for selectively closing flow of hot products of combustion directly from the firebox to said flue outlet and for diverting hot products of combustion to the down flue and through the passageway of the oven unit to said outlet flue.

2. In a stove of the character described, an oven including an inner shell having opposite side walls, a top and a bottom, a casing enclosing the inner shell and having side walls, a top and a bottom spaced from corresponding walls of the inner shell to provide top, bottom and side passages for flow of hot gases, a flue outlet connection from the top passage, a pair of spaced converging baffles between said side walls of the casing and defining a duct having gradually decreasing capacity across the bottom passage and having edges diverging from one of said bottoms to provide outlets of gradually increasing capacity from said duct to portions of said bottom passage leading to the side passages, means for admitting hot gases into the duct for lateral flow through said outlets to the side passages, and means forming a discharge duct above the top passage and having connection with said top passage through a slot in said top of the oven casing, said slot having gradually decreasing capacity in the direction of the flue outlet connection.

3. A stove of the character described including a casing enclosing a firebox and an oven, said oven having a passageway therearound for flow of products of combustion, a flue connecting the firebox with the passageway around the oven, a cooking top supported above the firebox and oven, a partition extending under the cooking top intermediate the firebox and oven and having openings at opposite ends thereof, means for controlling flow through the opening remote from the flue which connects the firebox with the passageway around the oven, an outlet flue having connection with the firebox and passageway around the oven, and a damper for selectively closing flow of hot products of combustion directly from the firebox to said outlet flue for diverting said hot products of combustion through said connecting flue to the flue passageways of the oven.

4. A stove of the character described including an oven, a firebox having a side spaced from a side of the oven to provide a side passage, casing means surrounding the firebox and oven and spaced from the oven to provide top and bottom passages and a side passage cooperating with the side passage between the oven and firebox for flow of hot gases around the oven, a cooking top carried by the casing and extending over the firebox and at least a part of the oven, a duct extending across the bottom passage and having outlets into portions of the bottom passage leading to the side passages, duct means connecting the firebox with said duct in the bottom passage for passing hot gases from the firebox for passage around the oven, a discharge duct extending over the oven and having connection with the top passage, said discharge duct being spaced from said side of the firebox to provide a passageway for flow of hot products of combustion to heat the portion of the cooking top extending over the oven and having spaced openings, a flue connection for the casing means having connection with the discharge duct and with said passageway under the cooking top, a damper controlling the flow connection remote from the flue connection, and a damper controlling flow from the passageway under the cooking top to the flue connection.

5. A stove of the character described including an oven, a firebox having a side spaced from a side of the oven to provide a side passage, casing means surrounding the firebox and oven and spaced from the oven to provide top and bottom passages and a side passage cooperating with the side passage between the oven and firebox for flow of hot gases around the oven, a cooking top carried by the casing and extending over the firebox and at least a part of the oven, a pair of spaced converging baffles dividing the bottom passage and defining a duct having gradually decreasing capacity across the bottom passage and having edges diverging from the casing means to provide outlet from said duct to portions of the bottom passage leading to the side passages, duct means connecting the firebox with said duct in the bottom passage for passing hot gases from the firebox for passage around the oven, a discharge duct extending over the oven and having connection with the top passage, said discharge duct being spaced from said side of the firebox to provide a passageway for flow of hot products of combustion under the portion of the cooking top extending over the oven and having spaced openings, a flue connection for the casing means having connection with the discharge duct and with said passageway under the cooking top, a damper controlling the flow connection remote from the flue connection, and a damper controlling flow from the passageway under the cooking top to the flue connection.

EDWIN ESSON.

REFERENCES CITED

The following references are of record in the file of this patent:

UNITED STATES PATENTS

| Number | Name | Date |
|---|---|---|
| 18,586 | Hyde | Nov. 10, 1857 |
| 46,422 | Little | Feb. 14, 1865 |
| 82,311 | Hayes | Sept. 22, 1868 |
| 150,048 | Hyde | Apr. 21, 1874 |
| 213,756 | Jewett | Apr. 1, 1879 |
| 435,006 | Anthony | Aug. 26, 1890 |
| 1,238,029 | Leggat | Aug. 21, 1917 |
| 2,072,276 | Pickup | Mar. 2, 1937 |
| 2,091,447 | Klemme | Aug. 31, 1937 |
| 2,121,473 | Barker | June 21, 1938 |

FOREIGN PATENTS

| Number | Country | Date |
|---|---|---|
| 597,988 | Germany | June 4, 1934 |